United States Patent
Lee et al.

(10) Patent No.: US 9,302,183 B2
(45) Date of Patent: Apr. 5, 2016

(54) PUSH-BUTTON STRUCTURE

(71) Applicant: Cheng Uei Precision Industry Co., Ltd., New Taipei (TW)

(72) Inventors: Tsung Shih Lee, New Taipei (TW); Li Wen Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 202 days.

(21) Appl. No.: 14/262,677

(22) Filed: Apr. 25, 2014

(65) Prior Publication Data

US 2015/0306495 A1   Oct. 29, 2015

(51) Int. Cl.
*A63F 13/21*   (2014.01)
*A63F 13/24*   (2014.01)

(52) U.S. Cl.
CPC ...................................... *A63F 13/24* (2014.09)

(58) Field of Classification Search
CPC ............. A63F 13/21; H01H 9/00; H01H 3/00
USPC ............................. 200/5 A, 6 A, 18; 345/156
See application file for complete search history.

(56) References Cited

U.S. PATENT DOCUMENTS

| | | | | | |
|---|---|---|---|---|---|
| 4,992,631 | A | * | 2/1991 | Gee | G05G 9/04785 200/339 |
| 5,207,426 | A | * | 5/1993 | Inoue | A63F 13/06 345/184 |
| 5,294,121 | A | * | 3/1994 | Chiang | H01H 25/041 200/339 |
| 5,716,274 | A | * | 2/1998 | Goto | A63F 13/06 345/169 |

\* cited by examiner

*Primary Examiner* — Edwin A. Leon
*Assistant Examiner* — Iman Malakooti
(74) *Attorney, Agent, or Firm* — Cheng-Ju Chiang

(57) ABSTRACT

A push-button structure includes a circuit board, a conductive adhesive mounted on the circuit board, a base column, a splinter and a button body. The base column has an assembling portion. A bottom end of the assembling portion is mounted to the circuit board through the conductive adhesive. The splinter mounted to a top end of the base column has a base plate. Several portions of an outer periphery of the base plate meander outward to form a plurality of elastic arms. A free end of the elastic arm is bent upward to form a fastening piece. The button body has a base portion. Several portions of an outer periphery of the bottom surface of the base portion protrude downward to form a plurality of propping plates. The propping plate hooks a top end of the fastening piece to keep a balance of the button body.

8 Claims, 5 Drawing Sheets

PUSH-BUTTON STRUCTURE

BACKGROUND OF THE INVENTION

1. Field of the Invention

The present invention generally relates to a push-button structure, and more particularly to a push-button structure applied in a game controller.

2. The Related Art

As is known to all, a push-button structure is applied in a game controller. The game controller is a device for game players to control a variety of functions or proceed a variety of operations when the game players play games, for example, controlling a controlled object in the game to move, controlling the controlled object in the game to jump, and controlling different directions. When different positions of the push-button structure are pressed by the game players, thereupon the controlled object in the game is controlled to move upward, downward or in other directions.

A current push-button structure for controlling the controlled object in the game to move in different directions is assembled to an enclosure of the game controller. The push-button structure includes a circuit board, a conductive adhesive and a button body. The circuit board is assembled to the enclosure of the game controller. A top of the circuit board defines four conductive contacts arranged in cross shape. The conductive adhesive is disposed to a top surface of the circuit board. The conductive adhesive defines four hollow elastic touching portions arranged in cross shape corresponding to the four conductive contacts. An inside of each touching portion is equipped with a conducting portion. The button body has a circular board-shaped base plate. A top surface of the base plate protrudes upward to form a cross-shaped pressing portion. A bottom surface of the base plate defines four pressing pillars arranged in cross shape and corresponding to the pressing portion. A middle of the bottom surface of the base plate protrudes downward to form a supporting pillar playing a pivot role. The button body is mounted to a top of the conductive adhesive. A bottom surface of each pressing pillar abuts against one of the touching portions of the conductive adhesive. A top of the pressing portion projects beyond a top surface of the enclosure. When the push-button structure is in use, different positions of the cross-shaped pressing portion pivoting the supporting pillar are pressed, the conducting portions of the touching portions of the conductive adhesive can contact with the conductive contacts of the circuit board to make an electrical connection so as to realize the control in different directions. When the pressing portion is pressed downward in the direction of 45 degrees, the conductive contacts of the circuit board is electrically connected with the conducting portions to realize the control in the direction of 45 degrees.

However, a balance of the button body is hardly restored after the button body of the push-button structure being released, and the button body of the push-button structure is felt worse in the process of controlling the controlled object in the game.

SUMMARY OF THE INVENTION

An object of the present invention is to provide a push-button structure assembled to an enclosure of a game controller. The push-button structure includes a circuit board, a conductive adhesive, a base column, a splinter and a button body. A top surface of the circuit board defines a plurality of conductive contacts. The conductive adhesive is mounted on the circuit board. Several portions of a top of the conductive adhesive protrude upward to form a plurality of elastic hollow touching portions. Each touching portion is disposed corresponding to one of the conductive contacts of the circuit board. An inside of each touching portion is equipped with a conducting portion, and a bottom of the conducting portion is exposed to a bottom of the touching portion. The base column has an assembling portion. A bottom end of the assembling portion is mounted to the circuit board through the conductive adhesive and located among the touching portions of the conductive adhesive and the conductive contacts of the circuit board. A top surface of the assembling portion is concaved downward to form a receiving groove. The splinter is mounted to a top end of the base column. The splinter has a base plate. Several portions of an outer periphery of the base plate meander outward to form a plurality of zigzag elastic arms. A free end of the elastic arm is bent upward to form a fastening piece. The button body is disposed to the splinter, the base column and the conductive adhesive to make the splinter located between the button body and the base column. The button body together with the splinter, the base column, the conductive adhesive and the circuit board is assembled to the enclosure, and a top end of the button body projects beyond a top surface of the enclosure. The button body has a base portion. A middle of a bottom surface of the base portion protrudes downward to form a supporting pillar. A bottom end of the supporting pillar is received in the receiving groove of the base column. A periphery of the bottom surface of the base portion defines a plurality of pressing pillars. Distal ends of the pressing pillars protrude beyond a bottom of the supporting pillar. Several portions of an outer periphery of the bottom surface of the base portion protrude downward to form a plurality of propping plates. Each propping plate is located between two of the pressing pillars and is corresponding to one of the fastening pieces of the splinter. A bottom surface of the pressing pillar abuts against a top surface of the touching portion of the conductive adhesive. The propping plate hooks a top end of the fastening piece of the elastic arm to keep a balance of the button body.

As described above, the splinter is disposed between the button body and the conductive adhesive, and several portions of the outer periphery of the base plate meander outward to form the zigzag elastic arms, the propping plate of the button body hooks the top end of the fastening piece of the elastic arm through the fastening hole so as to prevent the button body from swaying to keep a balance of the button body. The balance of the button body can be swiftly restored after the button body being released. So the button body of the push-button structure is felt better in the process of controlling the controlled object in the game.

BRIEF DESCRIPTION OF THE DRAWINGS

The present invention will be apparent to those skilled in the art by reading the following description, with reference to the attached drawings, in which.

DETAILED DESCRIPTION OF THE EMBODIMENT

Figure 1:
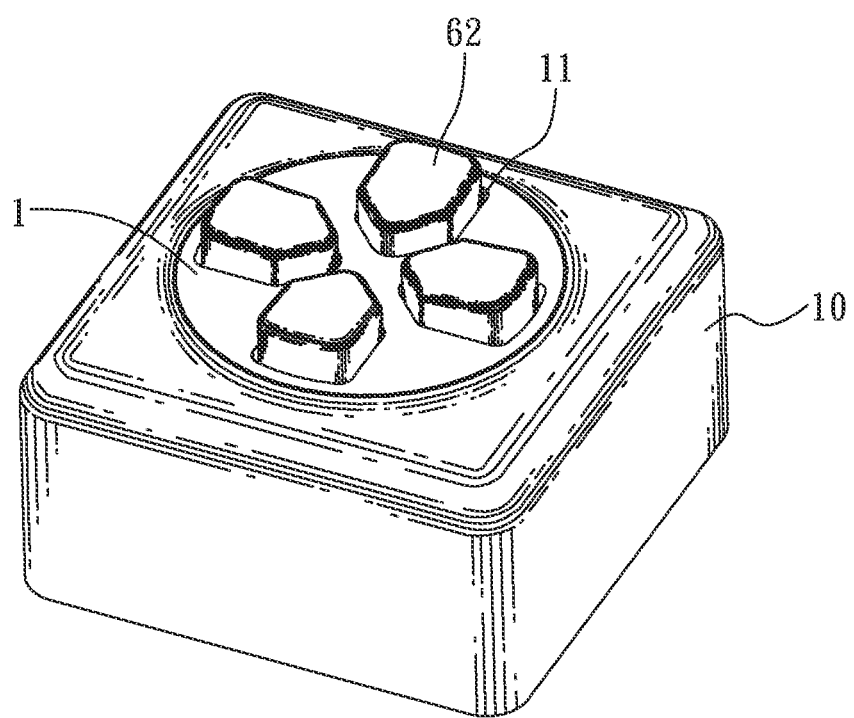
FIG. 1 is a perspective view of a push-button structure according to an embodiment of the present invention, wherein the push-button structure is assembled to an enclosure of a game controller.
Figure 2:
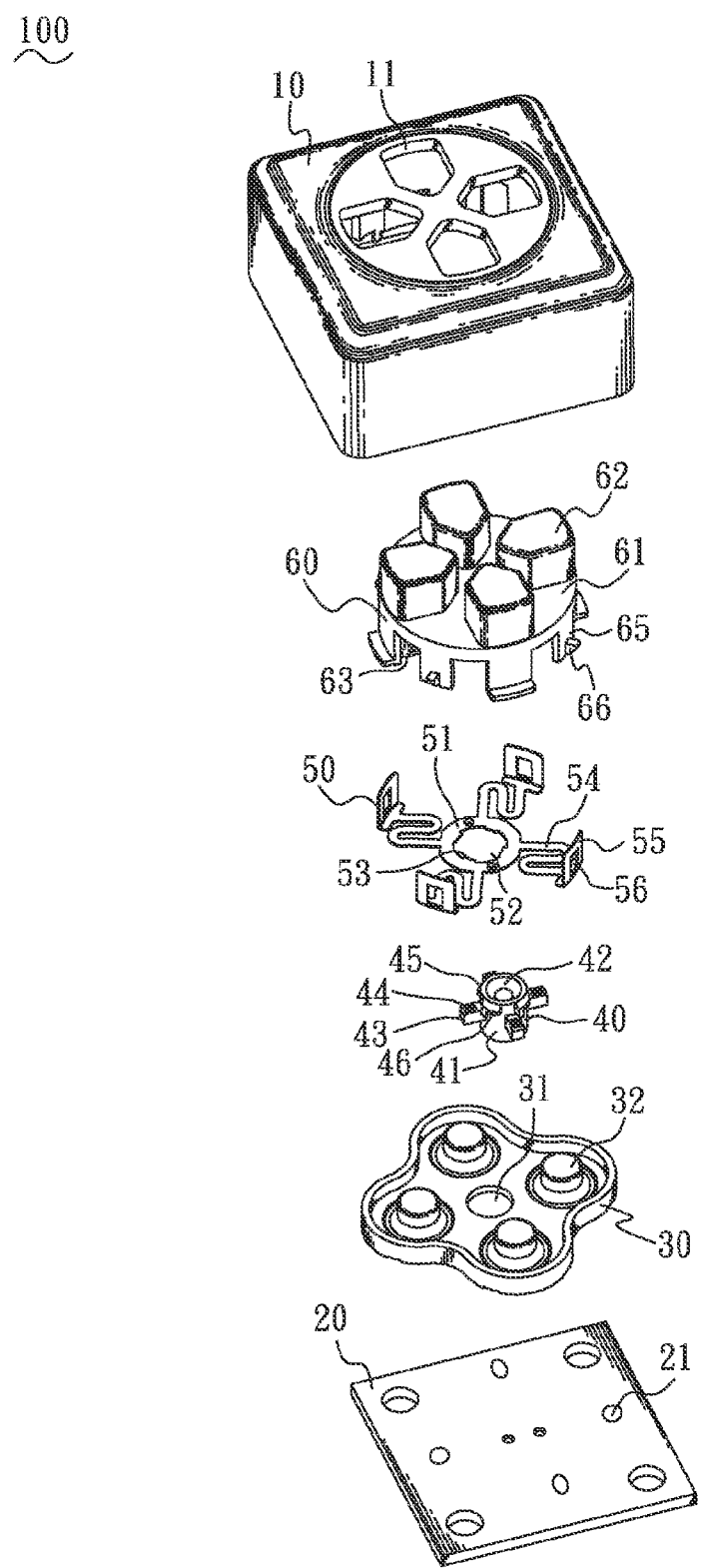
FIG. 2 is an exploded view of the push-button structure together with the enclosure of FIG. 1.

Referring to FIG. 1 and FIG. 2, a push-button structure 1 in accordance with an embodiment of the present invention is applied in a game controller 100. The game controller 100 includes an enclosure 10. The push-button structure 1 assembled to the enclosure 10 of the game controller 100, includes a circuit board 20, a conductive adhesive 30, a base column 40, a splinter 50 and a button body 60.

Referring to FIG. 2, the enclosure 10 defines four openings 11 which are symmetrical and arranged in cross shape. A top surface of the circuit board 20 defines a plurality of conductive contacts 21. In this embodiment, the top surface of the circuit board 20 defines four conductive contacts 21.

Figure 3:
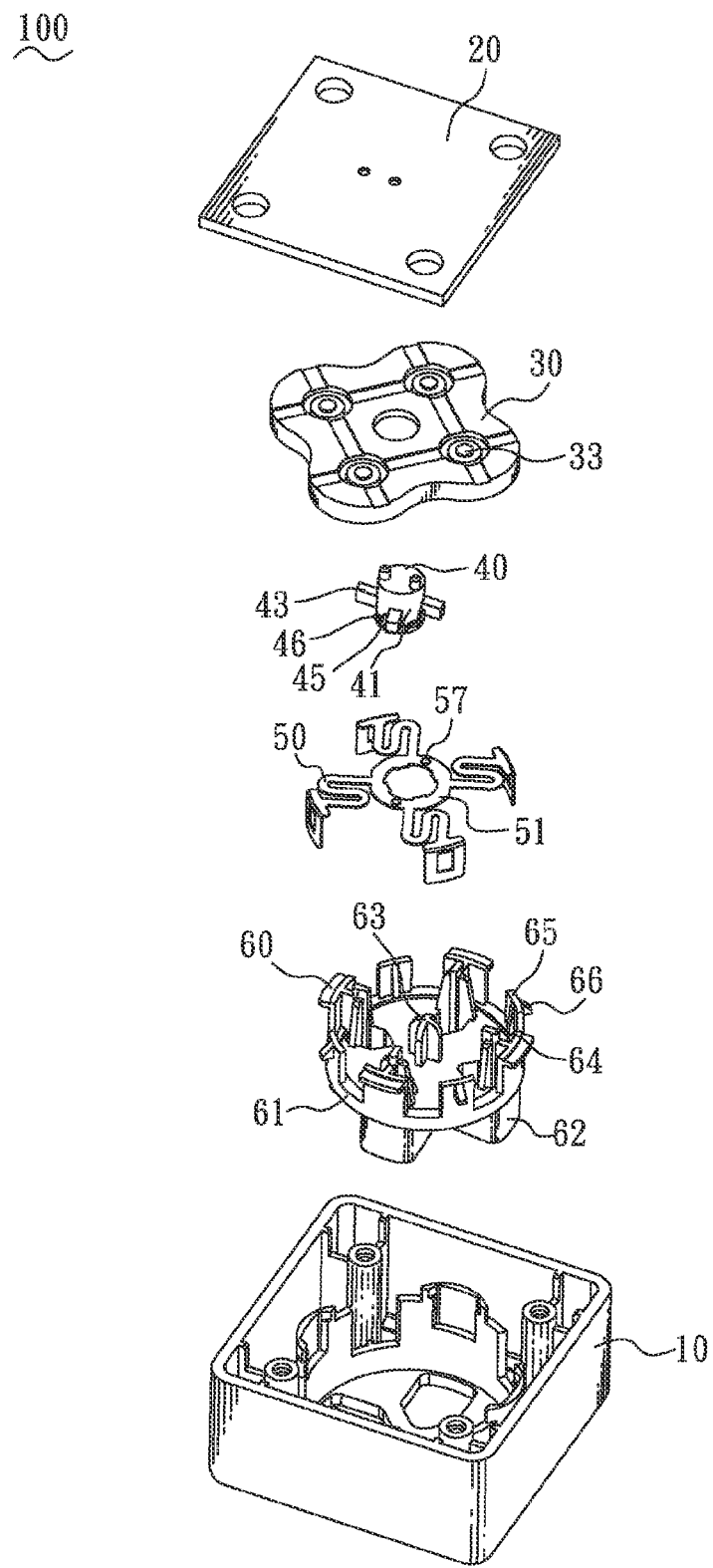
FIG. 3 is another exploded view of the push-button structure together with the enclosure of FIG. 1.
Figure 4:
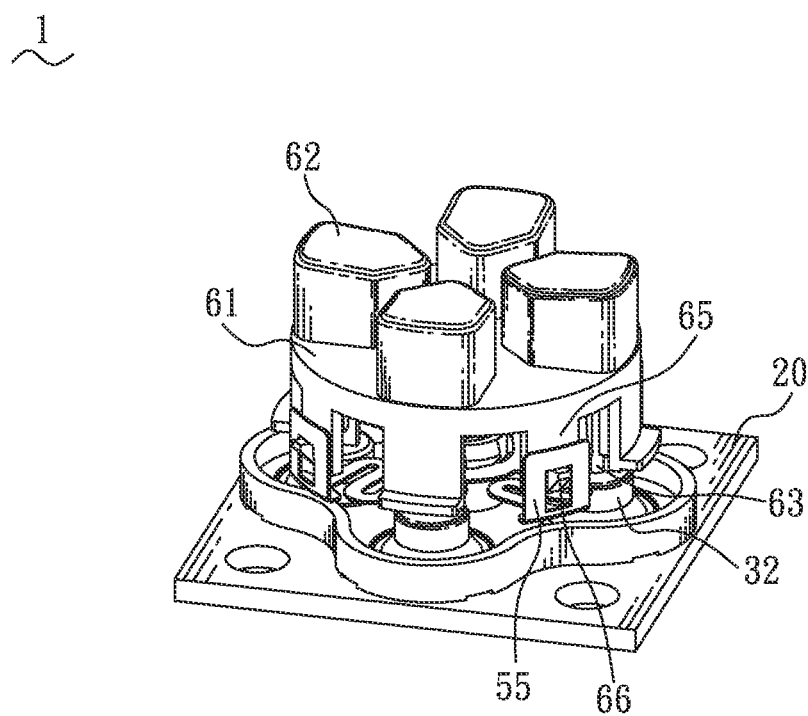
FIG. 4 is a perspective view of the push-button structure according to the embodiment of the present invention.
Figure 5:
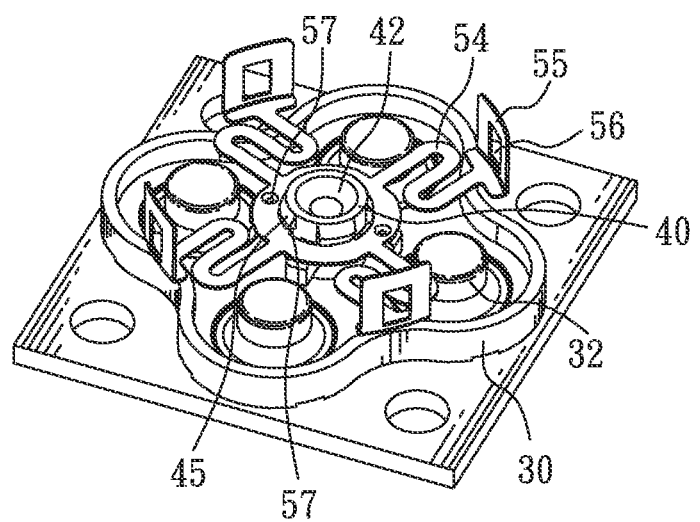
FIG. 5 is a perspective view of the push-button structure of FIG. 4, wherein a button body of the push-button structure is moved away.

Referring to FIG. 2, FIG. 3 and FIG. 5, the conductive adhesive 30 is mounted on the circuit board 20. A middle of the conductive adhesive 30 defines a circular first assembling hole 31. Several portions of a top of the conductive adhesive 30 protrude upward to form a plurality of elastic hollow touching portions 32. Each touching portion 32 is disposed corresponding to one of the conductive contacts 21 of the circuit board 20. A bottom of each of the elastic hollow touching portions 32 is opened freely. An inside of each touching portion 32 is equipped with a conducting portion 33, and a bottom of the conducting portion 33 is exposed to the bottom of the touching portion 32.

Referring to FIG. 2 again, the base column 40 has an assembling portion 41 of column shape. A top surface of the assembling portion 41 is concaved downward to form a circular receiving groove 42. Four portions of a substantial middle of an outer surface of the assembling portion 41 of the base column 40 protrude outward to form four rectangular protruding bars 43. A top surface of the protruding bar 43 is concaved downward to form a limiting groove 44. Four portions of a substantial top of the outer surface of the assembling portion 41 protrude outward to form four buckling portions 45. Each buckling portion 45 is partially located between two of the protruding bars 43. Top surfaces of the buckling portions 45 are in alignment with a top surface of the assembling portion 41. A bottom of one side surface of the buckling portion 45 is connected with a top of one side surface of the protruding bar 43 of the base column 40. The buckling portion 45 defines a buckling groove 46 penetrating through a bottom of the other side surface and a bottom surface thereof. A bottom end of the assembling portion 41 of the base column 40 is mounted to a middle of the circuit board 20 through the first assembling hole 31 of the conductive adhesive 30 and is located among the touching portions 32 of the conductive adhesive 30 and the conductive contacts 21 of the circuit board 20.

Referring to FIG. 2, FIG. 3 and FIG. 5, the splinter 50 is mounted to a top end of the assembling portion 41 of the base column 40. The splinter 50 has a circular base plate 51. A middle of the base plate 51 of the splinter 50 defines a circular second assembling hole 52. Four portions of an inner periphery of the second assembling hole 52 protrude inward to form four symmetrical buckling slices 53. Several portions of an outer periphery of the base plate 51 meander outward to form a plurality of zigzag elastic arms 54.

Referring to FIG. 2, FIG. 3 and FIG. 5, in this embodiment, four portions of the outer periphery of the base plate 51 meander outward to form four zigzag elastic arms 54 which are symmetrical and arranged in cross shape. A free end of each elastic arm 54 is bent upward to form a fastening piece 55. The fastening piece 55 of the splinter 50 defines a rectangular fastening hole 56. A bottom surface of the base plate 51 defines at least two limiting portions 57. Two of the limiting portions 57 are disposed oppositely and each limiting portion 57 is located between two of the elastic arms 54 of the splinter 50. In this embodiment, the bottom surface of the base plate 51 defines two limiting portions 57. The top end of the assembling portion 41 of the base column 40 passes through the second assembling hole 52 of the splinter 50 to make the base plate 51 of the splinter 50 mounted to the top end of the assembling portion 41 of the base column 40. The bottom surface of the base plate 51 is adhered to the top surfaces of the protruding bars 43 and the limiting portions 57 are limited in the limiting grooves 44 to limit the base plate 51 rotating. The buckling slices 53 of the base plate 51 are buckled in the buckling grooves 46 of the buckling portions 45, a top surface of the buckling slice 53 abuts against a top sidewall of the buckling groove 46, and one side surface of the buckling slice 53 abuts against an inner sidewall of the buckling groove 46 to limit the base plate 51 moving upward.

Referring to FIG. 1 to FIG. 4, the button body 60 is disposed to the splinter 50, the base column 40 and the conductive adhesive 30 to make the splinter 50 located between the button body 60 and the base column 40. The button body 60 together with the splinter 50, the base column 40, the conductive adhesive 30 and the circuit board 20 is assembled to the enclosure 10, and a top end of the button body 60 projects beyond a top surface of the enclosure 10.

Referring to FIG. 1 to FIG. 4, the button body 60 has a circular board-shaped base portion 61. Four portions of a top surface of the base portion 61 of the button body 60 protrude upward to form four rectangular pressing portions 62 which are symmetrical and arranged in cross shape. A middle of a bottom surface of the base portion 61 protrudes downward to form a supporting pillar 63. A bottom end of the supporting pillar 63 of the button body 60 shows a spherical shape. A periphery of the bottom surface of the base portion 61 defines a plurality of pressing pillars 64. Each pressing pillar 64 of the button body 60 is corresponding to one of the pressing portions 62. Distal ends of the pressing pillars 64 protrude beyond a bottom of the supporting pillar 63. Several portions of an outer periphery of the bottom surface of the base portion 61 protrude downward to form a plurality of propping plates 65.

Referring to FIG. 1 to FIG. 4, in this embodiment, four portions of the outer periphery of the bottom surface of the base portion 61 protrude downward to form four propping plates 65. Each propping plate 65 is located between two of the pressing pillars 64 and is corresponding to one of the fastening pieces 55 of the splinter 50. A bottom of an outer surface of each propping plate 65 of the button body 60 protrudes outward to form a hooking portion 66. The base portion 61 is disposed to the splinter 50. A bottom end of the supporting pillar 63 is received in the receiving groove 42 of the base column 40. A bottom surface of the pressing pillar 64 abuts against a top surface of the touching portion 32 of the conductive adhesive 30. Each pressing pillar 64 of the button body 60 is disposed corresponding to one of the touching portions 32 of the conductive adhesive 30. Top ends of the pressing portions 62 project beyond the top surface of the enclosure 10 through the corresponding openings 11. The hooking portion 66 of the propping plate 65 of the button body 60 is fastened to the fastening hole 56. The hooking portion 66 of the propping plate 65 of the button body 60 hooks a top end of the fastening piece 55 of the elastic arm 54 through the fastening hole 56 so as to prevent the button body 60 from swaying to keep a balance of the button body 60.

Referring to FIG. 1 to FIG. 5, when one of the pressing portions 62 of the button body 60 is pressed downward, the supporting pillar 63 is acted as a pivot, a process of the pressing pillar 64 is controlled by virtue of utilizing a lever principle. The pressing pillar 64 corresponding to the pressing portion 62 which is pressed downward exerts a force on the touching portion 32 of the conductive adhesive 30 to make the touching portion 32 move downward and brings along the conducting portion 33 disposed inside the touching portion 32 to move downward until a bottom surface of the conducting portion 33 abuts against the conductive contact 21 of the circuit board 20 to make an electrical connection between the conducting portion 33 and the circuit board 20. At the moment, the two hooking portions 66 of the two propping plates 65 adjacent to the pressing portion 62 which is pressed downward move downward along the fastening holes 56. The other two hooking portions 66 of the two propping plates 65 away from the pressing portion 62 which is pressed downward are raised up along the fastening holes 56, and the hooking portions 66 of the propping plates 65 away from the pressing portion 62 which is pressed downward hook the top ends of the fastening pieces 55 to make outer ends of the elastic arms 54 raised up together with the hooking portions 66 of the propping plates 65, the elastic arms 54 accumulate elastic potential energy. The pressing portion 62 is released to make the elastic arms 54 release the elastic potential energy, and the pressing portion 62 of the button body 60 is restored to a status before the pressing portion 62 being pressed downward so as to restore the balance of the button body 60 under elastic force action of the elastic arms 54.

When the two adjacent pressing portions 62 of the button body 60 are pressed downward to control a controlled object in a game to move in the direction of 45 degrees, the three hooking portions 66 of the three propping plates 65 adjacent to the two pressing portions 62 which are pressed downward move downward along the fastening holes 56. The hooking portion 66 of the propping plate 65 away from the two pressing portion 62 which are pressed downward is raised up along the fastening hole 56, and the hooking portion 66 of the propping plate 65 hooks the top end of the fastening piece 55 to make the outer end of the elastic arm 54 raised up, the elastic arm 54 accumulates the elastic potential energy. The pressing portions 62 of the button body 60 is released to make the elastic arm 54 release the elastic potential energy, and the pressing portions 62 are restored to the status before the pressing portions 62 being pressed downward so as to restore the balance of the button body 60 under the elastic force action of the elastic arm 54.

As described above, the splinter 50 is disposed between the button body 60 and the conductive adhesive 30, and several portions of the outer periphery of the base plate 51 meander outward to form the zigzag elastic arms 54, the propping plate 65 of the button body 60 hooks the top end of the fastening piece 55 of the elastic arm 54 through the fastening hole 56 so as to prevent the button body 60 from swaying to keep a balance of the button body 60. The balance of the button body 60 can be swiftly restored after the button body 60 being released. So the button body 60 of the push-button structure 1 is felt better in the process of controlling the controlled object in the game.

What is claimed is:

1. A push-button structure assembled to an enclosure of a game controller, comprising:
    a circuit board, a top surface of the circuit board defining a plurality of conductive contacts;
    a conductive adhesive mounted on the circuit board, several portions of a top of the conductive adhesive protruding upward to form a plurality of elastic hollow touching portions, each touching portion being disposed corresponding to one of the conductive contacts of the circuit board, an inside of each touching portion being equipped with a conducting portion, and a bottom of the conducting portion being exposed to a bottom of the touching portion;
    a base column having an assembling portion, a bottom end of the assembling portion being mounted to the circuit board through the conductive adhesive and located among the touching portions of the conductive adhesive and the conductive contacts of the circuit board, a top surface of the assembling portion being concaved downward to form a receiving groove;
    a splinter mounted to a top end of the base column, the splinter having a base plate, several portions of an outer periphery of the base plate meandering outward to form a plurality of zigzag elastic arms, a free end of the elastic arm being bent upward to form a fastening piece; and
    a button body disposed to the splinter, the base column and the conductive adhesive to make the splinter located between the button body and the base column, the button body together with the splinter, the base column, the conductive adhesive and the circuit board being assembled to the enclosure, and a top end of the button body projecting beyond a top surface of the enclosure, the button body having a base portion, a middle of a bottom surface of the base portion protruding downward to form a supporting pillar, a bottom end of the supporting pillar being received in the receiving groove of the base column, a periphery of the bottom surface of the base portion defining a plurality of pressing pillars, distal ends of the pressing pillars protruding beyond a bottom of the supporting pillar, several portions of an outer periphery of the bottom surface of the base portion protruding downward to form a plurality of propping plates, each propping plate being located between two of the pressing pillars and being corresponding to one of the fastening pieces of the splinter, a bottom surface of the pressing pillar abutting against a top surface of the touching portion of the conductive adhesive, the propping plate hooking a top end of the fastening piece of the elastic arm to keep a balance of the button body.

2. The push-button structure as claimed in claim 1, wherein the fastening piece of the splinter defines a fastening hole, a bottom of an outer surface of each propping plate of the button body protrudes outward to form a hooking portion, the hooking portion of the propping plate of the button body hooks the top end of the fastening piece of the elastic arm through the fastening hole.

3. The push-button structure as claimed in claim 1, wherein the enclosure defines four openings, four portions of a top surface of the base portion of the button body protrude upward to form four pressing portions which are symmetrical and arranged in cross shape, top ends of the pressing portions project beyond the top surface of the enclosure through the corresponding openings.

4. The push-button structure as claimed in claim 3, wherein each pressing pillar of the button body is corresponding to one of the pressing portions, and is disposed corresponding to one of the touching portions of the conductive adhesive.

5. The push-button structure as claimed in claim 1, wherein four portions of a substantial middle of an outer surface of the assembling portion of the base column protrude outward to form four protruding bars, four portions of a substantial top of the outer surface of the assembling portion protrude outward to form four buckling portions, each buckling portion is partially located between two of the protruding bars, a middle of the base plate of the splinter defines a circular second assembling hole, four portions of an inner periphery of the second assembling hole protrude inward to form four buckling slices, a top end of the assembling portion passes through the second assembling hole of the splinter to make the base plate of the splinter mounted to the top end of the assembling portion of the base column, a bottom surface of the base plate is adhered to top surfaces of the protruding bars, the buckling slices are buckled in the buckling portions.

6. The push-button structure as claimed in claim 5, wherein top surfaces of the buckling portions are in alignment with a top surface of the assembling portion, a bottom of one side surface of the buckling portion is connected with a top of one side surface of the protruding bar of the base column, the buckling portion defines a buckling groove penetrating through a bottom of the other side surface and a bottom surface thereof, the buckling slices of the base plate are buckled in the buckling grooves, a top surface of the buckling slice abuts against a top sidewall of the buckling groove, and one side surface of the buckling slice abuts against an inner sidewall of the buckling groove.

7. The push-button structure as claimed in claim 5, wherein the top surface of the protruding bar of the base column is concaved downward to form a limiting groove, a bottom surface of the base plate of the splinter defines at least two limiting portions, two of the limiting portions are disposed oppositely and each limiting portion is located between two of the elastic arms of the splinter, the limiting portions are limited in the limiting grooves.

8. The push-button structure as claimed in claim 1, wherein a bottom end of the supporting pillar of the button body shows a spherical shape.

* * * * *